United States Patent
Dong

(10) Patent No.: US 11,210,119 B2
(45) Date of Patent: Dec. 28, 2021

(54) METHOD AND DEVICE FOR DISPLAYING INTERFACE, ELECTRONIC EQUIPMENT, SERVER, AND STORAGE MEDIUM

(71) Applicant: BEIJING XIAOMI MOBILE SOFTWARE CO., LTD., Beijing (CN)

(72) Inventor: Yongqing Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/882,261

(22) Filed: May 22, 2020

(65) Prior Publication Data

US 2021/0173681 A1 Jun. 10, 2021

(30) Foreign Application Priority Data

Dec. 10, 2019 (CN) .......................... 201911258870.8

(51) Int. Cl.
*G06F 9/451* (2018.01)
*G06F 3/0481* (2013.01)

(52) U.S. Cl.
CPC ............ *G06F 9/454* (2018.02); *G06F 3/0481* (2013.01)

(58) Field of Classification Search
CPC .............................. G06F 9/454; G06F 3/0481
See application file for complete search history.

(56) References Cited

U.S. PATENT DOCUMENTS

| | | | | |
|---|---|---|---|---|
| 7,185,333 B1 * | 2/2007 | Shafron | ................. | G06F 9/454 717/173 |
| 8,869,015 B2 * | 10/2014 | Olsen | .................... | G06F 40/143 715/200 |
| 2006/0155527 A1 * | 7/2006 | Choi | ...................... | G06F 9/454 704/2 |
| 2007/0150258 A1 | 6/2007 | Lister et al. | | |
| 2007/0225966 A1 | 9/2007 | Suen et al. | | |
| 2007/0288853 A1 | 12/2007 | Neil | | |
| 2008/0016112 A1 * | 1/2008 | Reddy | ..................... | G06F 9/454 |
| 2010/0088695 A1 | 4/2010 | Kakinari et al. | | |
| 2011/0264440 A1 * | 10/2011 | Zhou | ...................... | G06F 40/58 704/8 |
| 2012/0016927 A1 * | 1/2012 | Leffert | ................... | G06Q 30/02 709/203 |

(Continued)

FOREIGN PATENT DOCUMENTS

CN 105867920 A 8/2016

OTHER PUBLICATIONS

Extended European Search Report dated Dec. 22, 2020 in European Patent Application No. 20182919.9, 10 pages.

*Primary Examiner* — Shen Shiau
(74) *Attorney, Agent, or Firm* — Oblon, McClelland, Maier & Neustadt, L.L.P.

(57) ABSTRACT

Aspects of the disclosure are directed to a system and method for displaying an interface, where interface data of a to-be-displayed interface of a first target application (APP) are acquired. A first request is sent to a server. At least one language resource returned by the server is received. For each interface element in the interface data, a target language resource corresponding to the each interface element in the interface data is determined in the at least one language resource. The to-be-displayed interface of the first target APP is displayed based on the interface data and the target language resource.

12 Claims, 10 Drawing Sheets

(56) References Cited

U.S. PATENT DOCUMENTS

| | | | |
|---|---|---|---|
| 2014/0280704 A1* | 9/2014 | Ongg | H04L 67/28 709/217 |
| 2015/0134322 A1* | 5/2015 | Cuthbert | G06F 40/58 704/3 |
| 2016/0034450 A1* | 2/2016 | Chin | G06F 40/51 704/3 |
| 2016/0179789 A1* | 6/2016 | Chen | G06F 40/58 704/3 |
| 2019/0056961 A1* | 2/2019 | Dimov | G06F 16/958 |

* cited by examiner

METHOD AND DEVICE FOR DISPLAYING INTERFACE, ELECTRONIC EQUIPMENT, SERVER, AND STORAGE MEDIUM

CROSS-REFERENCE TO RELATED APPLICATIONS

This application is based on, and claims benefit of priority to, Chinese Application No. 201911258870.8 filed on Dec. 10, 2019. Disclosure of the Chinese Application is hereby incorporated by reference in its entirety.

BACKGROUND

In general, an application (APP) in electronic equipment may have to be adapted to operate internationally. For example, if an APP is to be promoted in different countries or regions, languages of the countries or the regions may have to be displayed on an interface of the APP. Specifically, if an APP is to be promoted in Japan, then Japanese may have to be displayed in an interface of the APP. Similarly, if an APP is to be promoted in Thailand, then Thai may have to be displayed in an interface of the APP.

To promote an APP in different countries and regions, the APP may have to be developed by integrating, in an interface of the APP, language resources of the countries or regions where the APP is to be promoted. For example, if an APP is to be promoted in Japan, then the APP may have to be developed by integrating a Japanese resource corresponding to the APP in an interface of the APP. Accordingly, Japanese may be displayed on an interface of the APP.

SUMMARY

Exemplary embodiments herein provide a method and device for displaying an interface, electronic equipment, a server, and a storage medium, capable of accelerating loading of the interface by not integrating a language resource in interface data. A technical solution herein may be implemented as follows.

According to an aspect herein, a method for displaying an interface can include acquiring interface data of a to-be-displayed interface of a first target application (APP), sending a first request to a server, and receiving at least one language resource returned by the server. Further, for each interface element in the interface data, the method can include determining, in the at least one language resource, a target language resource corresponding to the each interface element in the interface data, and displaying the to-be-displayed interface of the first target APP based on the interface data and the target language resource corresponding to the each interface element in the interface data.

According to an aspect herein, a method for displaying an interface can include receiving a first request sent by electronic equipment, the first request including at least an application (APP) identifier of a first target APP, and acquiring a language resource file corresponding to the first target APP according to the APP identifier. The method can further include acquiring at least one language resource by parsing the language resource file, and returning the at least one language resource to the electronic equipment.

According to an aspect herein, electronic equipment may include one or more processors and transitory or non-transitory memory. The transitory or non-transitory memory may be adapted to storing an instruction executable by the one or more processors. The one or more processors may be adapted to acquire interface data of a to-be-displayed interface of a first target application (APP), send a first request to a server, and receive at least one language resource returned by the server. The one or more processors can be further adapted to, for each interface element in the interface data, determine, in the at least one language resource, a target language resource corresponding to the each interface element in the interface data, and display the to-be-displayed interface of the first target APP based on the interface data and the target language resource corresponding to the each interface element in the interface data.

According to an aspect herein, a server may include one or more processors and transitory or non-transitory memory. The transitory or non-transitory memory may be adapted to storing an instruction executable by the one or more processors. The one or more processors may be adapted to receive a first request sent by electronic equipment, the first request including at least an application (APP) identifier of a first target APP, acquire a language resource file corresponding to the first target APP according to the APP identifier, acquire at least one language resource by parsing the language resource file, and return the at least one language resource to the electronic equipment.

According to an aspect herein, a non-transitory computer-readable storage medium has stored thereon instructions which, when executed by a processor of electronic equipment, allow the electronic equipment to implement the method for displaying an interface.

According to an aspect herein, a non-transitory computer-readable storage medium has stored thereon instructions which, when executed by a processor of electronic equipment, allow the electronic equipment to implement the method for displaying an interface.

The above general description and elaboration below are but exemplary and explanatory, and do not limit the subject disclosure.

BRIEF DESCRIPTION OF THE ACCOMPANYING DRAWINGS

Drawings for describing embodiments herein are introduced below briefly for clearer illustration of a technical solution of embodiments herein. Note that the drawings described below refer merely to some embodiments herein. A person having ordinary skill in the art may acquire other drawings according to the drawings herein without creative effort.

DETAILED DESCRIPTION

Figure 1:
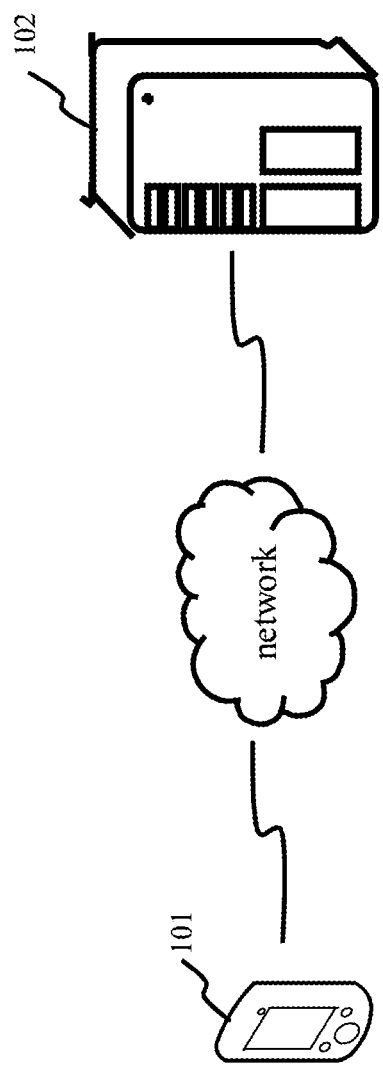
FIG. 1 is a diagram of an environment of implementation according to an exemplary embodiment.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device) and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

In addition, a term such as "first", "second", etc., may serve but for description purposes and should not be construed as indication or implication of relevancy, or implication of a quantity of technical features under consideration. Accordingly, a feature with an attributive "first", "second", etc., may expressly or implicitly include at least one such feature. Herein by "multiple", it may mean two or more unless indicated otherwise expressly.

An express APP may be a novel APP. An express APP may run based on a native Application Programming Interface (API) provided by an Operating System (OS). An express APP may be developed according to a unified standard, and rendered natively. An express APP may have advantages of both a 5th generation Hyper Text Markup Language (HTML5) interface and a native APP. A framework of an express APP may be deeply integrated in an OS and operated at an OS level, connecting seamlessly to another APP service. Once developed by a developer, an express APP may run on different types of equipment. An express APP may be used in a click-to-run mode without having to be downloaded and installed by a user.

Due to peculiarity thereof, an express APP may be expected to complete more tasks and implement more functions. Functionality of an express APP is being perfected gradually. With embodiments herein, a novel function of an express APP is provided. With the novel function, an express APP may be adapted to an internationalization demand for multiple languages without massive development, expanding functionality of the express APP, improving processing capability and practicability of the express APP.

FIG. 1 is a diagram of an environment of implementation according to an exemplary embodiment. Referring to FIG. 1, the environment of implementation may include electronic equipment 101 and a server 102. The electronic equipment 101 may be connected to the server 102 through a wireless or wired network.

The electronic equipment 101 may be a computer, a mobile phone, a smart TV, wearable equipment, a tablet computer, and the like. The server 102 may be a server, a cluster of servers, a cloud computing center, and the like. The server 102 may be a background server of an express APP.

A second target APP may be an APP preset in an OS of the electronic equipment 101. A second target APP may be an APP provided by a third party. For example, a second target APP may be an APP such as an APP downloading center, an express APP center, and the like. An identifier of a link to start a first target APP may be displayed in an interface of a second target APP. The electronic equipment 101 may enter the first target APP quickly through the identifier of the link to start the first target APP. A first target APP may be any APP not installed on the electronic equipment 101. A first target APP may be an express APP. For example, a first target APP may be an express APP providing a user with any service, such as an express shopping APP, an express music APP, an express takeaway APP, an express video APP, an express social APP, an express browser APP, and the like.

The server 102 may serve a first target APP. To display a to-be-displayed interface of a first target APP in a specific language environment, the electronic equipment 101 may acquire interface data of the to-be-displayed interface and at least one language resource corresponding to the first target APP through the server 102. The electronic equipment may display the to-be-displayed interface of the first target APP according to the interface data and the at least one language resource.

Figure 2:
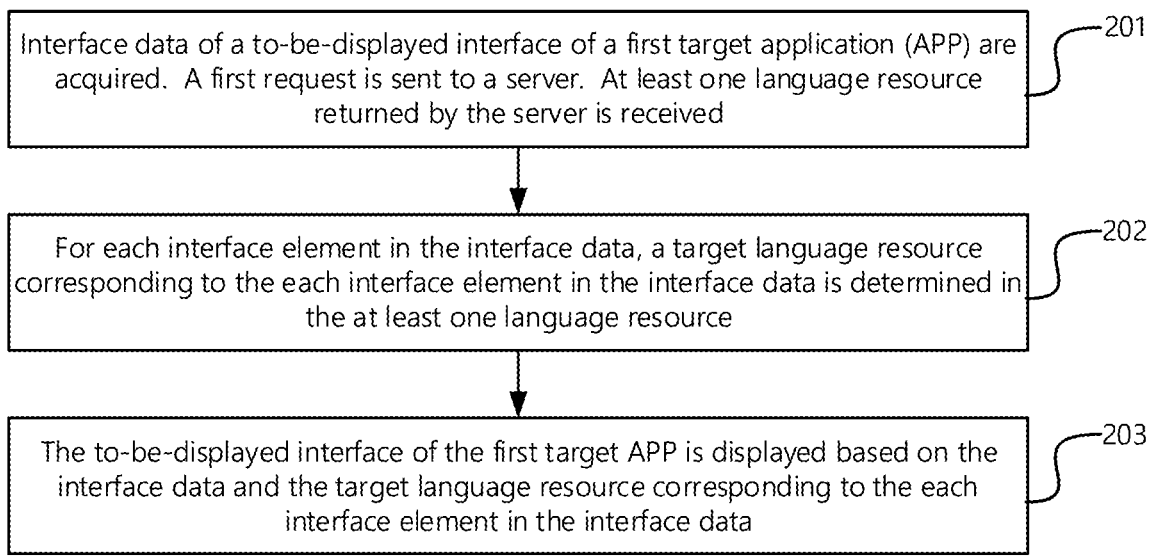
FIG. 2 is a flowchart of a method for displaying an interface according to an exemplary embodiment.

FIG. 2 is a flowchart of a method for displaying an interface according to an exemplary embodiment. Referring to FIG. 2, the method for displaying an interface may include a step as follows.

In S201, interface data of a to-be-displayed interface of a first target application (APP) are acquired. A first request is sent to a server. At least one language resource returned by the server is received.

In S202, for each interface element in the interface data, a target language resource corresponding to the each interface element in the interface data is determined in the at least one language resource.

In S203, the to-be-displayed interface of the first target APP is displayed based on the interface data and the target language resource corresponding to the each interface element in the interface data.

With embodiments herein, at least one language resource corresponding to a first target APP is independent of interface data of a to-be-displayed interface of the first target APP. The at least one language resource corresponding to the first target APP is not integrated in the interface data of the to-be-displayed interface of the first target APP. The interface data are of a less volume. Accordingly, the to-be-displayed interface may be loaded at a greater speed based on the interface data, achieving a better result of displaying the interface while implementing a multi-language function.

According to a possible implementation, the at least one language resource may include language resources in multiple language environments corresponding to the first target APP.

The target language resource in the at least one language resource that corresponds to the each interface element in the interface data may be determined as follows.

A target language environment corresponding to the first target APP may be acquired. The target language resource in the at least one language resource that corresponds to the each interface element in the interface data may be determined according to the target language environment and the each interface element in the interface data. According to a possible implementation, each language resource in the at least one language resource may include a language identifier and an interface element identifier. The language identifier may be adapted to identifying a language environment corresponding to the each language resource. The interface element identifier may be adapted to identifying an interface element corresponding to the each language resource.

The target language resource in the at least one language resource that corresponds to the each interface element in the interface data may be determined according to the target language environment and the each interface element in the interface data as follows. The target language resource in the at least one language resource that matches the target language environment and the each interface element in the interface data may be determined according to the target language environment, the language identifier, the each interface element in the interface data, and the interface element identifier.

According to a possible implementation, the at least one language resource may include a language resource corresponding to the first target APP in a target language environment.

Each language resource in the at least one language resource may include an interface element identifier. The interface element identifier may be adapted to identifying an interface element corresponding to the each language resource.

The target language resource in the at least one language resource that corresponds to the each interface element in the interface data may be determined as follows.

The target language resource in the at least one language resource that matches the each interface element in the interface data may be determined according to the interface element identifier.

According to a possible implementation, the to-be-displayed interface of the first target APP may be displayed based on the interface data and the target language resource corresponding to each interface element in the interface data as follows.

The target language resource may be assigned to the each interface element in the interface data. Each interface element in the interface data that has been assigned the target language resource may be displayed on the to-be-displayed interface of the first target APP according to the interface data.

According to a possible implementation, the method may further include a step as follows.

A second request may be sent to the server to acquire the interface data of the to-be-displayed interface of the first target APP. The interface data returned by the server may be received.

Figure 3:
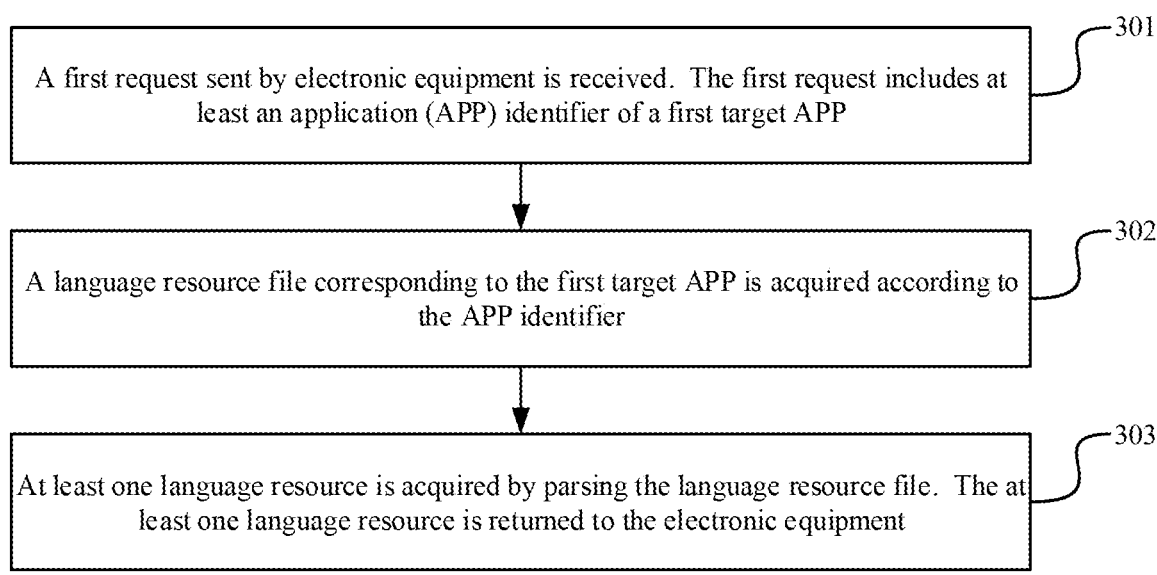
FIG. 3 is a flowchart of a method for displaying an interface according to an exemplary embodiment.

FIG. 3 is a flowchart of a method for displaying an interface according to an exemplary embodiment. Referring to FIG. 3, the method for displaying an interface may include a step as follows.

In S301, a first request sent by electronic equipment is received. The first request includes at least an application (APP) identifier of a first target APP.

In S302, a language resource file corresponding to the first target APP is acquired according to the APP identifier.

In S303, at least one language resource is acquired by parsing the language resource file. The at least one language resource is returned to the electronic equipment.

With embodiments herein, a server may provide a first target APP with any language resources in multiple language environments corresponding to the first target APP. When a first target APP is to switch between language environments, rapid switching may be implemented based on language resources provided by a server. A language resource corresponding to a target language environment to which the first target APP is to switch does not have to be acquired once again from the server, improving efficiency of the first target APP in language environment switch.

According to a possible implementation, the first request may further include a target language environment corresponding to the first target APP.

The at least one language resource may be acquired by parsing the language resource file as follows. Multiple language resources may be acquired by parsing the language resource file. The at least one language resource in the multiple language resources that matches the target language environment may be selected.

Figure 4:
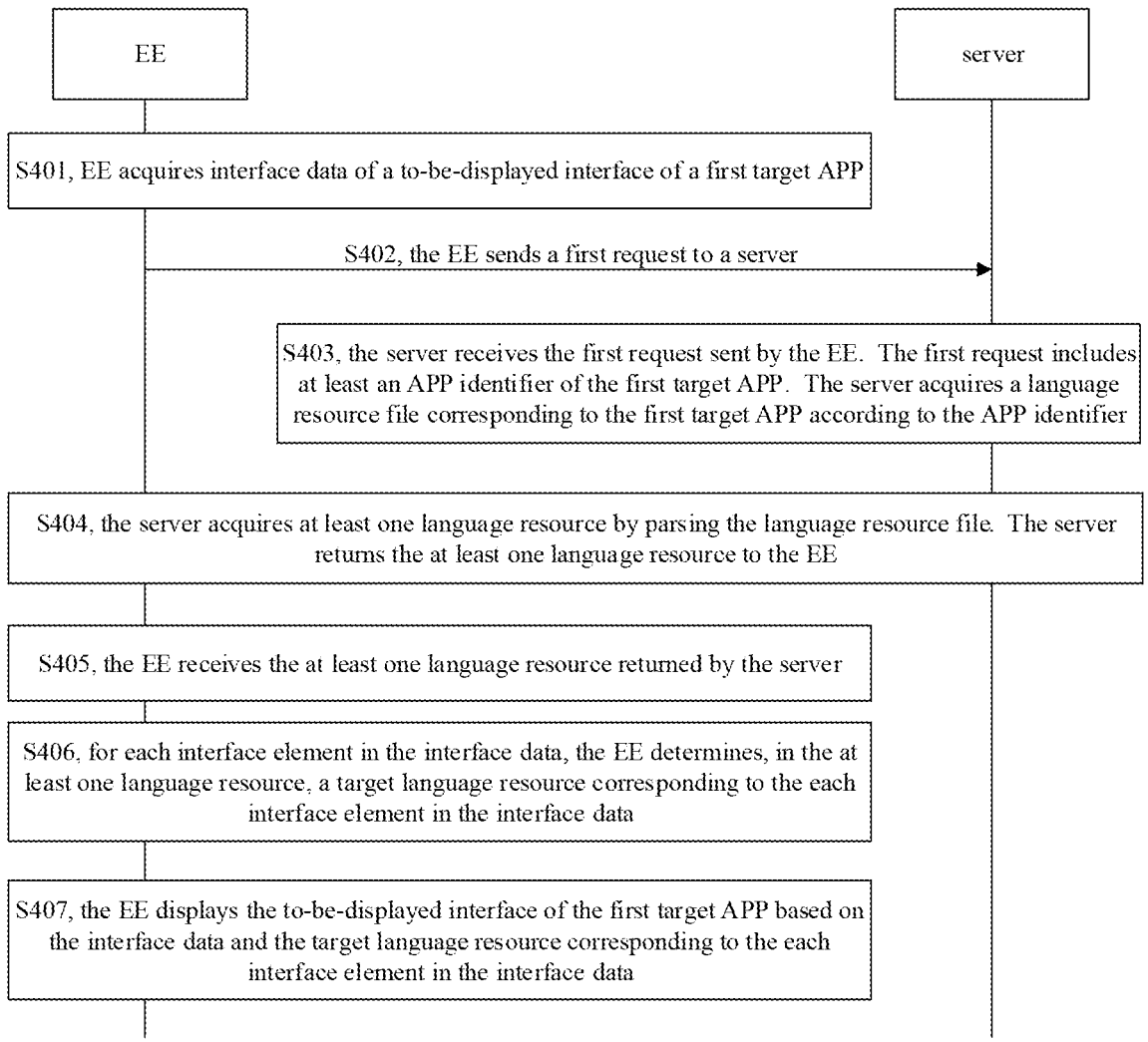
FIG. 4 is a flowchart of interaction in a method for displaying an interface according to an exemplary embodiment.

FIG. 4 is a flowchart of interaction in a method for displaying an interface according to an exemplary embodiment. Referring to FIG. 4, the method for displaying an interface may include a step as follows.

In S401, electronic equipment acquires interface data of a to-be-displayed interface of a first target APP. Interface data may include at least one interface element and information related to display of an interface, such as an interface interaction logic and information on layout of the interface related to the at least one interface element, and the like. Based on interface data, electronic equipment may provide a visualized interactive interface on a display. Interface data may be encapsulated in a file in a JavaScript (JS, a script language) format. For example, a to-be-displayed interface of a first target APP may include a first interface and a second interface. Interface data of the first interface may be encapsulated in a file page1.js. Interface data of the second interface may be encapsulated in a file page2.js.

An interface element may include a content view, a temporary view, a control, a label, and the like. For example, a content view may be an image view. An image view may be adapted to loading an image. A content view may also be a text view. A text view may accommodate and display multiple lines of text. A temporary view may be a pop-up box. A pop-up box may include prompting information and a selection button. A control may be a button, a drop-down menu, a text box, and the like. A label may be adapted to displaying static text.

A to-be-displayed interface may be any interface of a first target APP. A to-be-displayed interface may be a main interface of a first target APP. For example, when electronic equipment receives an instruction to start a first target APP, a to-be-displayed interface may be a home page of the first target APP. A to-be-displayed interface may be any sub-interface of a first target APP. For example, when electronic equipment receives an instruction to jump to a third interface, a to-be-displayed interface is the third interface.

According to a possible implementation, a first target APP may be an APP not installed to electronic equipment. The electronic equipment may acquire interface data of a to-be-displayed interface through a server. Accordingly, the electronic equipment may acquire the interface data of the to-be-displayed interface of the first target APP as follows. The electronic equipment may send a second request to the server. The second request may be adapted to requesting the interface data of the to-be-displayed interface of the first target APP. The electronic equipment may receive the interface data returned by the server.

The second request sent to the server by the electronic equipment may include a Uniform Resource Locator (URL) of the to-be-displayed interface. The server may store a correspondence between a URL and interface data. Accordingly, the server may receive the second request sent by the electronic equipment. The server may return the interface data of the to-be-displayed interface to the electronic equipment as follows. The server may receive the second request sent by the electronic equipment. The server may determine interface data corresponding to the URL included in the second request according to the URL included in the second request and the correspondence between a URL and interface data. The server may return the interface data to the electronic equipment.

With embodiments herein, electronic equipment may acquire interface data of a latest to-be-displayed interface through a server. Accordingly, the electronic equipment may display the latest to-be-displayed interface based on the interface data with an improved result of displaying the interface.

According to a possible implementation, a first target APP may be an APP not installed locally. To display a to-be-displayed interface on electronic equipment for the first time, the electronic equipment may receive interface data returned by a server. The electronic equipment may store the interface data in a cache. For a to-be-displayed interface that has been displayed on electronic equipment before, the electronic equipment may acquire interface data of the to-be-displayed interface from a cache. Accordingly, a cache of electronic equipment may store a correspondence between a URL of a to-be-displayed interface and interface data of the to-be-displayed interface. Electronic equipment may acquire interface data of a to-be-displayed interface of a first target APP as follows. The electronic equipment may acquire a URL of the to-be-displayed interface. The electronic equipment may acquire the interface data corresponding to the URL from a cache according to the URL.

With embodiments herein, when receiving interface data returned by a server, electronic equipment may store the interface data returned by the server in a local cache. For a to-be-displayed interface that has been displayed before, the electronic equipment may acquire interface data of the to-be-displayed interface directly from the cache. Accordingly, interface data of a to-be-displayed interface may be acquired at a greater speed, improving efficiency in displaying the interface.

A first target APP may be an APP not installed to electronic equipment. The electronic equipment may start the first target APP through a second target APP installed locally. Accordingly, electronic equipment may start a first target APP as follows. The electronic equipment may display a target interface of a second target APP installed locally. The target interface may include an identifier of a link to start the first target APP that is not installed locally. When detecting a trigger of an identifier of a link to start the first target APP, the electronic equipment may send a request to the server to request interface data of a start interface of the first target APP. The electronic equipment may receive the interface data of the start interface of the first target APP returned by the server. The electronic equipment may display the start interface of the first target APP based on the interface data. The start interface may be an interface displayed while the first target APP is starting. For example, a start interface may be a main interface of a first target APP.

A second target APP may be an APP, such as an APP downloading center, an express APP center, a desktop APP, etc., that has been installed to electronic equipment. A target interface may include an identifier of a link to start a first target APP. The identifier of the link to start the first target APP may be adapted to trigger of displaying, by the electronic equipment, the start interface of the first target APP.

For example, a second target APP may be an APP downloading center. Electronic equipment may receive an operation to search for a first target APP. The electronic equipment may display a result of the search in a target interface. The result of the search may include an identifier of a link to start the first target APP. An identifier of a link to start the first target APP may be an identifier of "instant start". When receiving an operation triggering the identifier of the link to start the first target APP, electronic equipment may start the first target APP. The electronic equipment may display the start interface of the first target APP.

As an example, a second target APP may be an express APP center. When receiving an operation that triggers starting the second target APP, electronic equipment may display a target interface of the second target APP. The target interface may include an identifier of a link to start the first target APP. The identifier of the link to start the first target APP may be a quick start icon corresponding to the first target APP. When receiving an operation triggering the identifier of the link to start the first target APP, electronic equipment may start the first target APP. The electronic equipment may display the start interface of the first target APP.

As an example, a second target APP may be a desktop APP. A target interface of the second target APP may include an identifier of a link to start the first target APP. The identifier of the link to start the first target APP may be a quick start icon corresponding to the first target APP. When receiving an operation triggering the identifier of the link to start the first target APP, electronic equipment may start the first target APP. The electronic equipment may display the start interface of the first target APP.

With embodiments herein, a user may run a first target APP without having to download an installation package corresponding to the first target APP or install the first target APP on electronic equipment. Accordingly, a local storage space of the electronic equipment is saved. A function of the first target APP may be used by directly triggering an identifier of a link to start the first target APP, thereby improving user experience.

According to a possible implementation, a first target APP may be an APP installed to electronic equipment. Electronic equipment may acquire interface data of a to-be-displayed interface of a first target APP from a local resource. The local resource may be resource data acquired by parsing an installation package of the first target APP.

In S402, the electronic equipment sends a first request to a server. A first request may be adapted to requesting a language resource corresponding to a first target APP from a server. A first target APP may have to apply to different countries and regions. A language of a corresponding country or region may have to be displayed on an interface. For example, a first target APP may have to apply to a language environment of Japanese. Japanese may have to be displayed on an interface. A first target APP may have to apply to a language environment of English. English may have to be displayed on an interface.

A language resource corresponding to a first target APP may be a language possibly to be displayed on an interface of the first target APP. For example, if "Hello" is to be displayed on an interface of a first APP, a language resource corresponding to the first target APP may include English "hello", Chinese "你好", Japanese "こんにちは", and the like.

According to a possible implementation, a first request may include only an APP identifier corresponding to a first target APP. The first request may be adapted to requesting any language resource corresponding to the first target APP from a server. The any language resource may include language resources of various language environments corresponding to any interface element in any interface of the first target APP.

According to a possible implementation, a first request may include both an APP identifier corresponding to a first target APP and a target language environment corresponding to the first target APP. The first request may be adapted to requesting, from a server, a language resource in the target language environment corresponding to the first target APP. For example, a first target APP may correspond to a target language environment of English. A first request may request, from a server, only English language resources corresponding to any interface element in any interface of the first target APP.

In case a first request includes both an APP identifier corresponding to a first target APP and a target language environment corresponding to the first target APP, electronic equipment may acquire the target language environment corresponding to the first target APP before sending the first request to a server.

According to a possible implementation, electronic equipment may determine a target language environment corresponding to a first target APP according to a language setting corresponding to the first target APP. Accordingly, electronic equipment may acquire a target language environment corresponding to a first target APP as follows. The electronic equipment may acquire a language setting corresponding to the first target APP. The electronic equipment may determine the target language environment corresponding to the first target APP according to the language setting.

Electronic equipment may determine a target language environment corresponding to a first target APP by acquiring a language setting of a system including the first target APP. For example, a language setting of a system of electronic equipment is English. Then, the electronic equipment may determine a target language environment corresponding to a first target APP to be English.

Electronic equipment may acquire a language setting of a system including a first target APP every time the first target APP starts. Electronic equipment may acquire a language setting of a system including a first target APP only when the first target APP starts for the first time. The electronic equipment may determine a target language environment corresponding to the first target APP according to the language setting. The electronic equipment may record the target language environment. When the first target APP starts again after the first time, the electronic equipment may acquire the recorded target language environment. The electronic equipment may take the recorded target language environment as the target language environment corresponding to the first target APP.

A target language environment corresponding to a first target APP may change along with a change in a language setting of a system including the first target APP. For example, a language setting of a system including a first target APP may change from Chinese to English. Then, a target language environment corresponding to the first target APP may also change from Chinese to English.

A target language environment corresponding to a first target APP may not change along with a change in a language setting of a system including the first target APP. For example, a language setting of a system including a first target APP may change from Chinese to English. A target language environment corresponding to the first target APP may remain Chinese.

Electronic equipment may support that a user may set whether a target language environment corresponding to a first target APP changes along with a change in a language setting of a system including the first target APP, as follows. The electronic equipment may display an interface for setting a language of the first target APP. The interface for setting a language may include an option to follow the system. When receiving an operation selecting the option to follow the system, the electronic equipment may determine that the target language environment corresponding to the first target APP is to change along with a change in the language setting of the system including the first target APP. When receiving no operation selecting the option to follow the system, the electronic equipment may determine that the target language environment corresponding to the first target APP is not going to change along with a change in the language setting of the system including the first target APP.

With embodiments herein, electronic equipment may determine a language environment according to a language setting of a system including a first target APP. The language environment determined as such may highly fit a language environment a user needs. In addition, the electronic equipment may determine and record the language environment of the system of the electronic equipment only when the first target APP starts for the first time. When the first target APP starts again after the first time, the electronic equipment may acquire the recorded target language environment directly, improving efficiency in acquiring a language environment.

Moreover, the target language environment corresponding to the first target APP may change along with a change in the language setting of the system including the first target APP, implementing flexible change in the language environment. Furthermore, the target language environment corresponding to the first target APP may not change along with a change in the language setting of the system including the first target APP, implementing a stable language environment corresponding to the first target APP.

A function for setting a language of a first target APP may also be provided. Electronic equipment may determine a language environment of the first target APP by acquiring a language set for the first target APP. Accordingly, electronic equipment may acquire a target language environment corresponding to a first target APP as follows. The electronic equipment may display an interface for setting a language of the first target APP. The interface for setting a language may include a control for setting a language. When receiving an operation triggering the control for setting a language, the electronic equipment may display a drop-down menu corresponding to the control for setting a language. drop-down menu may include at least one selectable language environment. The electronic equipment may receive an operation selecting a language environment in the at least one selectable language environment. The electronic equipment may determine the language environment selected by the operation as the target language environment corresponding to the first target APP.

With embodiments herein, electronic equipment may determine a target language environment corresponding to a first target APP according to a language set for the first target APP. A user may flexibly switch to a target language environment corresponding to the first target APP as needed.

According to a possible implementation, electronic equipment may determine a target language environment corresponding to a first target APP according to information on a location of the electronic equipment. Accordingly, electronic equipment may acquire a target language environment corresponding to a first target APP as follows. The electronic equipment may acquire information on a location corresponding to the first target APP. The electronic equipment may determine the target language environment corresponding to the first target APP according to the information on the location.

Electronic equipment may determine a target language environment corresponding to a first target APP directly according to information on a location. For example, electronic equipment may acquire information on a location that indicates China. Then, the electronic equipment may determine a target language environment corresponding to a first target APP to be a Chinese language environment. Electronic equipment may acquire information on a location that indicates the USA. Then, the electronic equipment may determine a target language environment corresponding to a first target APP to be an English language environment.

Electronic equipment may determine a language environment according to a country or region corresponding to acquired information on a location. Accordingly, electronic equipment may determine a target language environment corresponding to a first target APP according to information on a location as follows. The electronic equipment may determine a country or region matching the information on the location. The electronic equipment may determine a language environment corresponding to the country or the region as the target language environment corresponding to the first target APP.

For example, information on a location acquired by electronic equipment may be a place name. Information on a location acquired by electronic equipment may be Beijing. The electronic equipment may determine that a country matching the information on the location may be China. Accordingly, the electronic equipment may determine that the electronic equipment is in a Chinese language environment. As an example, information on a location acquired by electronic equipment may be a latitude and a longitude. Information on a location acquired by electronic equipment may be 39.9° N and 116.3° E. The electronic equipment may determine that a country matching the information on the location may be China. Accordingly, the electronic equipment may determine that the electronic equipment is in a Chinese language environment.

Electronic equipment may store a correspondence between information on a location and a language environment. Electronic equipment may determine a target language environment corresponding to a first target APP according to information on a location and a correspondence between information on a location and a language environment.

Electronic equipment may send information on a location to a server. The electronic equipment may receive a language environment returned by the server. Accordingly, electronic equipment may determine a target language environment corresponding to a first target APP according to information on a location as follows. The electronic equipment may send a server a request for a language environment. The request for a language environment may include the information on the location of the first target APPs. The electronic equipment may receive a language environment returned by the server. The server may be adapted to determining the target language environment corresponding to the first target APP according to the information on the location and returning the target language environment to the electronic equipment.

With embodiments herein, electronic equipment may determine a language environment according to information on a location of the electronic equipment. The electronic equipment may adapt a language environment of the electronic equipment automatically without requiring a user to set a language or change a language setting, simplifying an operation by the user, improving user experience.

No strict chronological order has to be followed in performing S401 and S402. S401 may be performed first, and then S402 may be performed. Alternatively, S402 may be performed first, and then S401 may be performed. Alternatively, S401 and S402 may be performed simultaneously. With embodiments herein, no limit is set to a sequence in which S401 and S402 are performed.

In S403, the server receives the first request sent by the electronic equipment. The first request includes at least an APP identifier of the first target APP. The server acquires a language resource file corresponding to the first target APP according to the APP identifier.

A language resource file corresponding to a first target APP may be a file integrating language resources corresponding to multiple language environments. Integration in the language resource file may be of an APP level. For example, the language resource file may integrate language resources in multiple language environments such as Chinese, English, Japanese, Thai, etc. The language resource file may be a file in a JavaScript object notation (json) format, which is a lightweight data interchange format.

A first request may include an APP identifier of a first target APP. The APP identifier may be adapted to identifying the first target APP.

According to a possible implementation, an APP identifier of a first target APP may be an identifying field. For example, a first target APP may be WeChat. An APP identifier of the first target APP may be "wechat (a chat APP)". A server may acquire a language resource file matching the APP identifier. Accordingly, a server may acquire a language resource file corresponding to a first target APP according to an APP identifier as follows. The server may acquire the language resource file matching the APP identifier of the first target APP from language resource files corresponding to multiple APPs according to the APP identifier of the first target APP. For example, language resource files corresponding to multiple APPs may include "wechat.json", "weibo.json", "mgtv.json", etc. A first target APP may be WeChat. An APP identifier corresponding to the first target APP may be "wechat". A language resource file matching the APP identifier may be "wechat.json". That is, the language resource file corresponding to the first target APP may be "wechat.json".

With embodiments herein, a server may acquire a language resource file matching an APP identifier of a first target APP directly according to the APP identifier, improving efficiency in acquiring the language resource file.

According to a possible implementation, an APP identifier of a first target APP may be an identifier allocated to the first target APP according to a specific rule. For example, a first target APP may be WeChat. An APP identifier of the first target APP may be "a". A server may store a correspondence between an APP identifier and a language resource file. The server may acquire a language resource file corresponding to the first target APP according to the correspondence. Accordingly, a server may acquire a language resource file corresponding to a first target APP according to an APP identifier as follows. The server may acquire the language resource file corresponding to the APP identifier of the first target APP according to a correspondence between an APP identifier and a language resource file stored by the server, according to the APP identifier of the first target APP.

With embodiments herein, a server may determine a language resource file corresponding to a first target APP according to a correspondence between an APP identifier of the first target APP and a language resource file, improving accuracy in acquiring the language resource file.

In S404, the server acquires at least one language resource by parsing the language resource file. The server returns the at least one language resource to the electronic equipment. A server may acquire at least one language resource by parsing a language resource file at a driver layer. The server may provide a framework layer with the at least one language resource and return the at least one language resource to electronic equipment. Then, the at least one language resource may be provided to a first target APP. For example, a server may acquire at least one language resource by parsing a language resource file through a java (an object-oriented programming language) driver layer. The server may provide the at least one language resource to a java framework layer. Then, the at least one language resource may be provided to a first target APP.

A language resource acquired by parsing a language resource file may be in form of a key-value pair. The "key" in a key-value pair may include an interface element identifier corresponding to an interface element. The "value" in the key-value pair may be a target language resource corresponding to the interface element.

For example, a first target APP may include a first interface and a second interface. The first interface may include a first interface element. The second interface may include a second interface element and a third interface element. Content "hello" may have to be displayed in the first interface element. Content "message" may have to be displayed in the second interface element. Content "send" may have to be displayed in the third interface element. Then, English language resources may include en.p1.k1="hello", en.p2.k1="message", and en.p2.k2="send". Chinese language resources may include ch.p1.k11="你好", ch.p2.k1="消息", and ch.p2.2="发送". "en" may be adapted to representing an English language resource. "ch" may be adapted to representing a Chinese language resource.

According to a possible implementation, a first request may include only an APP identifier of a first target APP. A server may provide at least one language resource acquired by parsing a language resource file all to the first target APP according to the first request. The at least one language resource may include language resources in multiple language environments corresponding to the first target APP. For example, the at least one language resource may include language resources in multiple language environments corresponding to each interface element corresponding to the first target APP, such as Chinese content, English content, Japanese content, and the like.

With embodiments herein, a server may provide a first target APP with any language resources in multiple language environments corresponding to the first target APP. When a first target APP is to switch between language environments, rapid switching may be implemented based on language resources provided by a server. A language resource corresponding to a target language environment to which the first target APP is to switch does not have to be acquired once again from the server, improving efficiency of the first target APP in language environment switch.

According to a possible implementation, the first request may further include the target language environment corresponding to the first target APP. The server may provide the first target APP with the language resource matching the target language environment according to the target language environment corresponding to the first target APP. Accordingly, a server may acquire at least one language resource by parsing a language resource file as follows. The server may acquire multiple language resources by parsing the language resource file. The server may select the at least one language resource matching a target language environment from the multiple language resources.

A target language environment included in a first request may be represented by an identifying field. For example, a target language environment of Chinese may be represented by "ch". A target language environment of English may be represented by "en".

Multiple language resources acquired by parsing a language resource file may be in form of key-value pairs. A server may compare a field representing a target language environment to a "key" in a language resource. When the field representing the target language environment matches the "key" in the language resource, the server may provide at least one language resource matching the target language environment to a first target APP. For example, multiple language resources acquired by parsing a language resource file may include en.p1.k1="hello", en.p2.k1="message", en.p2.k2="send", ch.p1.k1="你好", ch.p2.k1="消息", ch.p2.k2="发送", etc. When the target language environment is Chinese, the server may provide the language resources ch.p1.k1="你好", ch.p2.k1="消息", and ch.p2.k2="发送" matching "ch" to the first target APP.

With embodiments herein, a server may provide a first target APP with a language resource in a target language environment corresponding to the first target APP according to the target language environment. Accordingly, electronic equipment does not have to acquire the language resource in the target language resource from language resources in multiple language environments, simplifying a step to be performed by the electronic equipment, improving efficiency of the electronic equipment in displaying an interface.

In S405, the electronic equipment receives the at least one language resource returned by the server. Electronic equipment may receive at least one language resource provided to a first target APP by a server. The at least one language resource and display of an interface of the first target APP may coexist in one thread. The at least one language resource and display of an interface of the first target APP may share one memory segment. Each to-be-displayed interface in the thread may access the at least one language resource.

With embodiments herein, integration in a language resource file may be of an APP level. Interface data and language resources are well organized. Moreover, a server may provide a first target APP with at least one language resource acquired by parsing a language resource file. Electronic equipment may allow the at least one language resource and display of an interface of the first target APP to coexist in one thread. Any interface in the thread may use the at least one language resource as long as there is one copy of the at least one language resource in the thread. No redundant copy of the at least one language resource is required in each piece of interface data of the first target APP, reducing a volume of the interface data. Accordingly, the interface may be loaded and displayed at a greater speed, improving performance of display of a multi-language interface.

In S406, for each interface element in the interface data, the electronic equipment determines, in the at least one language resource, a target language resource corresponding to the each interface element in the interface data.

According to a possible implementation, a first request sent to a server by electronic equipment may include only an APP identifier of a first target APP. At least one language resource provided to the first target APP by the server may include language resources in multiple language environments corresponding to the first target APP. The electronic equipment may have to determine a target language resource in the target language environment corresponding to the interface element according to the interface element and the target language environment corresponding to the first target APP. Accordingly, electronic equipment may determine, in at least one language resource, a target language resource corresponding to an interface element via steps (1) and (2) as follows.

In (1), the electronic equipment may acquire a target language environment corresponding to a first target APP. Electronic equipment may acquire a target language environment corresponding to a first target APP in a way same as how electronic equipment acquires a target language environment corresponding to a first target APP in S302, which is not repeated here.

In (2), the electronic equipment may determine, in the at least one language resource, the target language resource corresponding to the interface element according to the target language environment and the interface element.

Electronic equipment may determine, in at least one language resource, a target language resource matching a target language environment and an interface element. Accordingly, the step may be implemented as follows. Each language resource in at least one language resource may include a language identifier and an interface element identifier. The language identifier may be adapted to identifying a language environment corresponding to the each language resource. The interface element identifier may be adapted to identifying an interface element corresponding to the each language resource. Electronic equipment may determine, in the at least one language resource according to the target language environment, the language identifier, the each interface element in the interface data, and the interface element identifier, the target language resource that matches the target language environment and the each interface element in the interface data.

A target language environment acquired in (1) may be represented by an identifying field. For example, a target language environment of Chinese may be represented by "ch". A target language environment of English may be represented by "en". Each interface element in the interface data may also be represented by an identifying field. For example, a first target APP may include a first interface and a second interface. The first interface may include a first interface element. The second interface may include a second interface element and a third interface element. The first interface element may be represented by "p1.k1". The second interface element may be represented by "p2.k1". The third interface element may be represented by "p2.k2".

A language resource acquired by parsing a language resource file may be in form of a key-value pair. The "key" in a key-value pair may include a language identifier and an interface element identifier. For example, a language resource may be en.p.k1="hello". A key may be "en.p1.k1". A value may be "hello". Also, "en.p1.k1" may include a language identifier "en". The language identifier "en" may be adapted to identifying that a language resource corresponds to an English language environment. "en.p1.k1" may include an interface element identifier "p1.k1". "p1.k1" may be adapted to identifying that the language resource corresponds to the first interface element of the first interface.

Electronic equipment may determine, in at least one language resource, a target language resource matching a target language environment and an interface element according to a target language environment, a language identifier included in a language resource, the interface element, and an interface element identifier included in the language resource. For example, the at least one language resource may include en.p1.k="hello", en.p2.k1="message", en.p2.k2="send", ch.p1.k1="你好", ch.p2.k1="消息", ch.p2.k2="发送", etc. A target language environment may be Chinese. An interface element may be the first interface element. Then, a matching language resource may be determined to be ch.p1.k1="你好".

Electronic equipment may determine a target language resource corresponding to a target language environment and an interface element. When a first target APP is to switch between language environments, rapid switching may be implemented based on a target language environment, improving efficiency of the first target APP in language environment switch.

According to a possible implementation, a first request sent to a server by electronic equipment may include both an APP identifier of a first target APP and a target language environment. At least one language resource provided to the first target APP by the server may include a language resource in the target language environment corresponding to the first target APP. The electronic equipment may simply determine a target language resource matching an interface element. Accordingly, electronic equipment may determine, in at least one language resource, a target language resource corresponding to an interface element as follows. Each language resource in the at least one language resource may include an interface element identifier. The interface element identifier may be adapted to identifying an interface element corresponding to the each language resource. Electronic equipment may determine, in the at least one language resource according to the interface element identifier, the target language resource matching the each interface element in the interface data.

Each interface element in the interface data may also be represented by an identifying field. For example, a first target APP may include a first interface and a second interface. The first interface may include a first interface element. The second interface may include a second interface element and a third interface element. The first interface element may be represented by "p1.k1". The second interface element may be represented by "p2.k1". The third interface element may be represented by "p2.k2".

A language resource acquired by parsing a language resource file may be in form of a key-value pair. The "key" in a key-value pair may include an interface element identifier. For example, a language resource may be p1.k1="hello". A key may be "p1.k1". A value may be "hello". "p1.k1" may be an interface element identifier. "p1.k1" may be adapted to identifying that the language resource corresponds to a first interface element of the first interface.

Electronic equipment may determine, in at least one language resource, a target language resource matching an interface element according to the interface element and an interface element identifier included in a language resource. For example, a target language environment may be an English language environment. At least one language resource provided to a first target APP by a server may include p1.k1="hello", p2.k1="message", p2.k2="send", and the like. An interface element may be the first interface element. Then, a language resource matching the interface element may be determined to be p1.k1="你好".

With embodiments herein, electronic equipment may quickly determine a target language resource matching an interface element, improving efficiency in displaying an interface of a first target APP.

In S407, the electronic equipment displays the to-be-displayed interface of the first target APP based on the interface data and the target language resource corresponding to the each interface element in the interface data.

An interface of a first target APP may correspond to a piece of interface data. Interface data may include at least one interface element and information related to display of an interface, such as an interface interaction logic and information on layout of the interface related to the at least one interface element, etc. Electronic equipment may assign a target language resource corresponding to an interface element to the interface element. The electronic equipment may display the interface element on the to-be-displayed interface at a location corresponding to the interface data. Accordingly, electronic equipment may display a to-be-displayed interface of a first target APP based on interface data and a target language resource corresponding to each interface element in the interface data as follows. The electronic equipment may assign the target language resource to the each interface element in the interface data.

The electronic equipment may display, on the to-be-displayed interface of the first target APP according to the interface data, the each interface element in the interface data that has been assigned the target language resource.

An interface element may correspond to information such as to-be-displayed content, a display location, an operation interface, and the like. Electronic equipment may display a to-be-displayed interface of a first target APP as follows. The electronic equipment may assign a target language resource to to-be-displayed content corresponding to an interface element. The equipment may plot the interface element at a display location on the to-be-displayed interface according to the display location corresponding to the interface element. The equipment may associate the interface element with an operation interface corresponding to the interface element.

With embodiments herein, electronic equipment may assign a target language resource to an interface element. The electronic equipment may display the target language resource corresponding to a target language environment in a to-be-displayed interface. Accordingly, an interface may be displayed according to different language environments, extending a range to which a first target APP may apply. A first target APP may apply to multiple different countries and regions without massive development.

With embodiments herein, at least one language resource corresponding to a first target APP is independent of interface data of a to-be-displayed interface of the first target APP. The at least one language resource corresponding to the first target APP is not integrated in the interface data of the to-be-displayed interface of the first target APP. The interface data are of a less volume. Accordingly, the to-be-displayed interface may be loaded at a greater speed based on the interface data, achieving a better result of displaying the interface while implementing a multi-language function.

Any aforementioned optional technical solutions may be combined freely to form optional embodiments herein, which will not be elaborated herein one by one.

An express APP herein may be a novel form of APP based on a hardware platform of electronic equipment. An express APP may run based on a native API provided by an OS.

An express APP may be developed according to a unified standard, and rendered natively. An express APP may be used in a click-to-run mode without having to be installed. An express APP may provide experience (such as performance, system integration, interaction, etc.) of a native APP. A framework of an express APP may be deeply integrated in an OS and operated at an OS level, connecting seamlessly to another APP service. Once developed by a developer, an express APP may run on different types of electronic equipment. From the very beginning, standardization and unification of an express APP among electronic equipment manufacturers has been implemented at a level such as a specification of development, capability access, a developer service, etc., greatly reducing cost of adaptation of a developer.

Compared to a conventional APP, an express APP may have beneficial effects as follows.

An express APP may be used instantly in a click-to-run mode. A user does not have to wait. Also, an express APP may be everywhere. An express APP may be deeply integrated in a scene of application of electronic equipment. An express APP may be accessed anywhere, such as through a search engine, a smart assistant, smart recommendation, an APP store, a browser, and the like.

An express APP may be efficient. An express APP may be developed in a quasi-front-end development mode, with improved efficiency.

Figure 5:
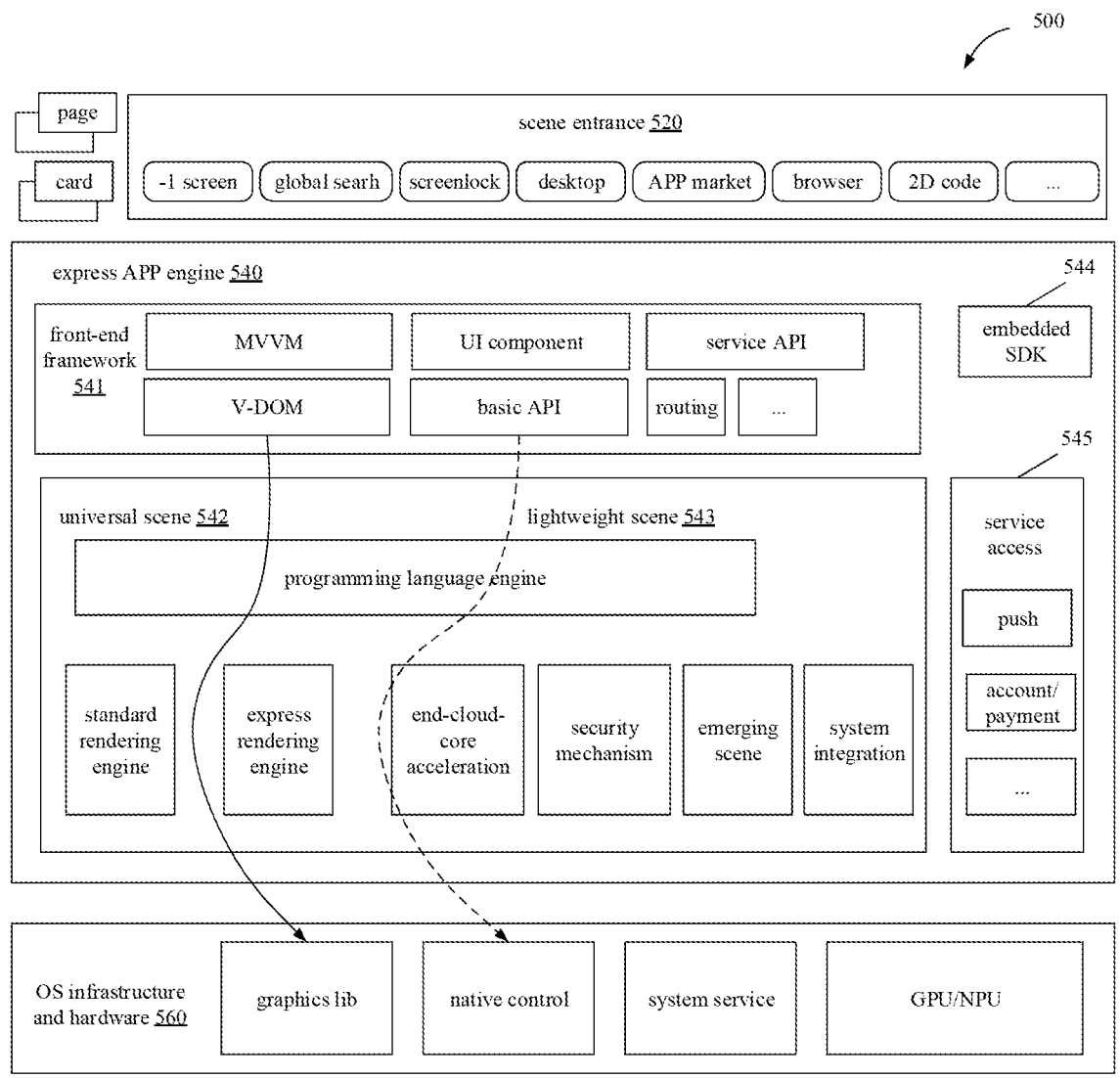
FIG. 5 is a block diagram of a framework of an express APP according to an exemplary embodiment.

FIG. 5 is a block diagram of a framework 500 of an express APP according to an exemplary embodiment. The framework of an express APP may include a scene entrance 520, an express APP engine 540, and an OS infrastructure and hardware 560.

The scene entrance 520 may include at least one of a −1 screen, a global search, a screen lock, a desktop, an APP market, a browser, a two-dimensional (2D) code, and the like. The scene entrance 520 may appear in form of a page, a card, and the like.

The express APP engine 540 may include a front-end framework 541, a universal scene 542, a lightweight scene 543, an embedded Software Development Kit (SDK) 544, and a service access 545.

The front-end framework 541 may include a Model-View-View-Model (MVVM), a Virtual-Document Object Model (V-DOM), a basic API, a service API, a User Interface (UI) component, a routing, and the like.

The universal scene 542 and the lightweight scene 543 may include a JS (programming language) engine, a standard rendering engine, an express rendering engine, an end-cloud-core acceleration, a security mechanism, an emerging scene such as Artificial Intelligence (A), Augmented Reality (AR), and the like, and a system integration (APP management, authority management, and the like).

The service access 545 may include push, account/payment, and the like.

The OS infrastructure and hardware 560 may include a graphics library, a native control, a system service, and a Graphics Processing Unit (GPU)/Neural-network Processing Unit (NPU), and the like.

In terms of a level of an execution path, a universal Web (World Wide Web) scene may be supported by a standard HTML5 mode. More lightweight and faster experience may be supported by combining a JS (programming language) mode and a native mode.

Architecture of an express APP engine is introduced below briefly in three aspects.

A first aspect may relate to APP development.

An idea in designing a mainstream front-end framework may inspire, and be integrated in, a front-end design of an express APP. An APP may be constructed using components. An MVVM design mode may have data binding as a core. Performance may be improved by a V-DOM. A concise clear Virtualmachine Unpack Engine (VUE)-like template may be selected. A layout may be simplified accordingly. A set of components and API specifications may have to be defined in terms of a novel form of APP, native UI mapping, open capability, and the like, to facilitate developing such an express APP.

A second aspect may relate to system integration.

As a complete form of APP, an express APP may be deeply integrated with a system. The express APP may run and interact with a system like a native APP. At present, an express APP may be in one of two forms, i.e., a full-screen independent APP and an embedded card. An express APP in form of an independent APP may render user experience just like a native APP by providing complete lifecycle management, page management, routing, and the like. An express APP may parasitize an android activity. A page may parasitize a fragment. An example may be controlled through an independent background service. As another form, a card may be embedded, through an embedded SDK, into every corner of the system as an independent local control for lightweight display of dynamic content. In terms of security isolation, fair security may be achieved via a sand box mechanism, process isolation, and authority control in combination with support at an OS layer.

A third aspect may relate to performance experience and an emerging scene such as a JS engine, a rendering engine, end-cloud-core acceleration, an emerging scene, and the like.

In terms of interaction experience, resource overhead, stability, and the like, by introducing a native rendering path, an express APP may effectively combine front-end development with native rendering and platform capability.

Unlike other cross-platform frameworks at an APP layer, an express APP may be rooted in an OS of electronic equipment, and implement deep integration of a chip, the OS, a cloud, and the like. For example, an end UE and a cloud may be combined to activate performance acceleration. By coordinated rendering of the cloud and the end UE, optimization of a network link layer may increase a starting speed of an express APP greatly. In addition, unique capability of a hardware platform may be integrated, further improving experience. For example, by combining an AI chip of the electronic equipment, computing capability of an NPU may be integrated in an express APP engine. Accordingly, an AI scene (such as face recognition, image super resolution, and the like.) may be implemented at an end UE side with a low delay and high performance, while protecting privacy of a user effectively, as well as saving a bandwidth.

Figure 6:
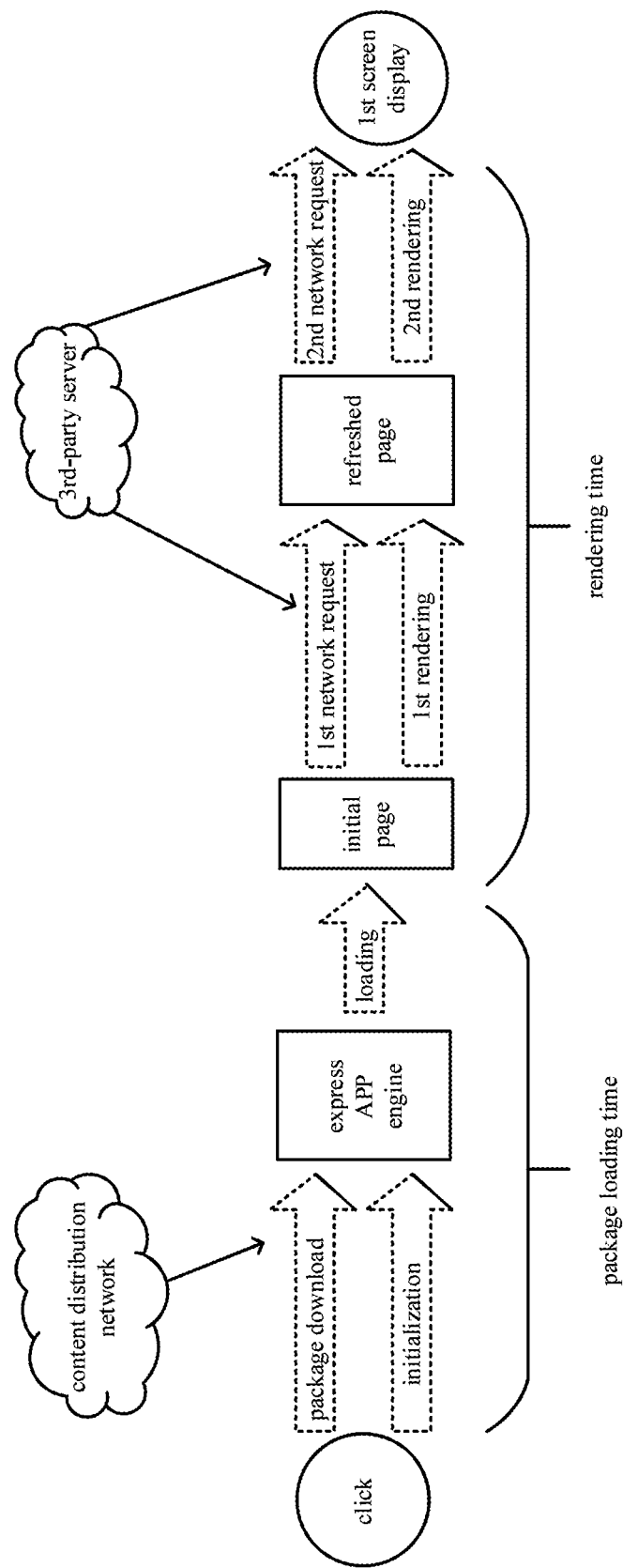
FIG. 6 is a flowchart of starting an express APP according to an exemplary embodiment.

FIG. 6 is a flowchart of starting an express APP according to an exemplary embodiment. A flow of starting an express APP may include an option as follows.

In a first option, when an express APP is started for the first time, a user may trigger download of a package of an express APP by a click. Meanwhile, work related to initialization of an express APP engine may be performed. After the whole package of the express APP is downloaded and checked, a JS file of a first page to be displayed may be loaded and rendering may be started.

In a second option, page rendering may include JS loading, page and JS framework logic execution, layout computation, and finally native UI control plotting. Execution of a logic in a page may include one or more network requests. Data returned in response to a network request may drive a second rendering of the page, until content of the page of a first screen is displayed completely.

A network request, JS execution, typesetting and plotting may not be in a simply serial relation, but interwoven in parallel, impacting overall performance of page rendering, and may be strongly correlated with a page design logic, a network condition, and a running state of equipment.

Due to peculiarity thereof, an express APP may be expected to complete more tasks and implement more functions. Functionality of an express APP is being perfected gradually. With embodiments herein, a novel function of an express APP is provided. With the novel function, an express APP may be adapted to an internationalization demand for multiple languages without massive development, expanding functionality of the express APP, improving processing capability and practicability of the express APP.

Figure 7:
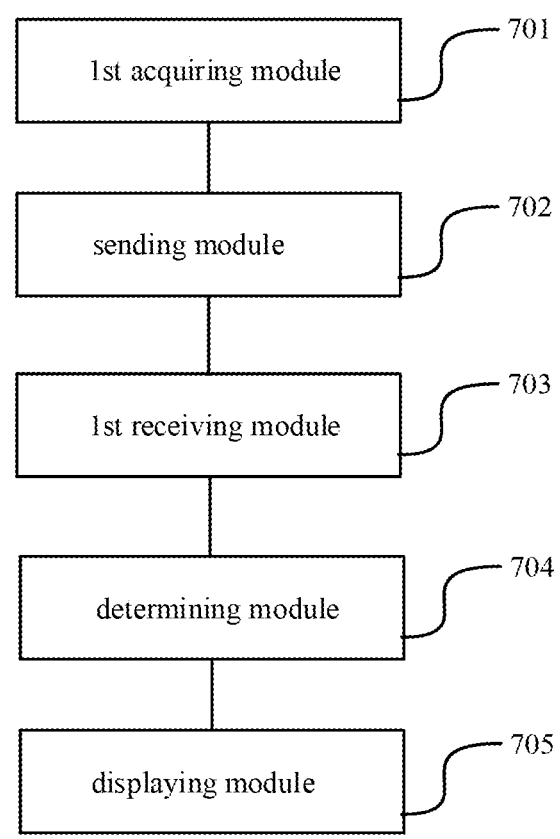
FIG. 7 is a block diagram of a device for displaying an interface according to an exemplary embodiment.

FIG. 7 is a block diagram of a device for displaying an interface according to an exemplary embodiment. Referring to FIG. 7, the device may include a first acquiring module, a sending module, a first receiving module, a determining module, and a displaying module.

The first acquiring module 701 is adapted to acquiring interface data of a to-be-displayed interface of a first target application (APP).

The sending module 702 is adapted to sending a first request to a server.

The first receiving module 703 is adapted to receiving at least one language resource returned by the server.

The determining module 704 is adapted to, for each interface element in the interface data, determining, in the at least one language resource, a target language resource corresponding to the each interface element in the interface data.

The displaying module 705 is adapted to displaying the to-be-displayed interface of the first target APP based on the interface data and the target language resource corresponding to the each interface element in the interface data.

According to a possible implementation, the at least one language resource may include language resources in multiple language environments corresponding to the first target APP. The determining module 704 may further be adapted to acquiring a target language environment corresponding to the first target APP, and determining, in the at least one language resource according to the target language environment and the each interface element in the interface data, the target language resource corresponding to the each interface element in the interface data.

According to a possible implementation, each language resource in the at least one language resource may include a language identifier and an interface element identifier. The language identifier may be adapted to identifying a language environment corresponding to the each language resource. The interface element identifier may be adapted to identifying an interface element corresponding to the each language resource. The determining module 704 may further be adapted to determining, in the at least one language resource according to the target language environment, the language identifier, the each interface element in the interface data, and the interface element identifier, the target language resource matching the target language environment and the each interface element in the interface data.

According to a possible implementation, the at least one language resource may include a language resource corresponding to the first target APP in a target language environment. Each language resource in the at least one language resource may include an interface element identifier. The interface element identifier may be adapted to identifying an interface element corresponding to the each language resource. The determining module 704 may further be adapted to determining, in the at least one language resource according to the interface element identifier, the target language resource matching the each interface element in the interface data.

According to a possible implementation, the displaying module 705 may further be adapted to assigning the target language resource to the each interface element in the interface data, and displaying, in the to-be-displayed interface of the first target APP according to the interface data, the each interface element in the interface data that has been assigned the target language resource.

According to a possible implementation, the sending module 702 may further be adapted to sending, to the server, a second request to acquire the interface data of the to-be-displayed interface of the first target APP.

The first receiving module 703 may further be adapted to receiving the interface data returned by the server.

With embodiments herein, at least one language resource corresponding to a first target APP is independent of interface data of a to-be-displayed interface of the first target APP. The at least one language resource corresponding to the first target APP is not integrated in the interface data of the to-be-displayed interface of the first target APP. The interface data are of a less volume. Accordingly, the to-be-displayed interface may be loaded at a greater speed based on the interface data, achieving a better result of displaying the interface while implementing a multi-language function.

Division of the functional modules in implementing the function of the device according to embodiments herein is merely illustrative. In application, the function may be allocated to be carried out by different functional modules as needed. That is, an internal structure of the equipment may be divided into different functional modules for carrying out all or part of the function. The device according to embodiments herein belongs to one concept as the method according to embodiments herein, implementation of which is elaborated in method embodiments herein, and is not repeated here.

Figure 8:
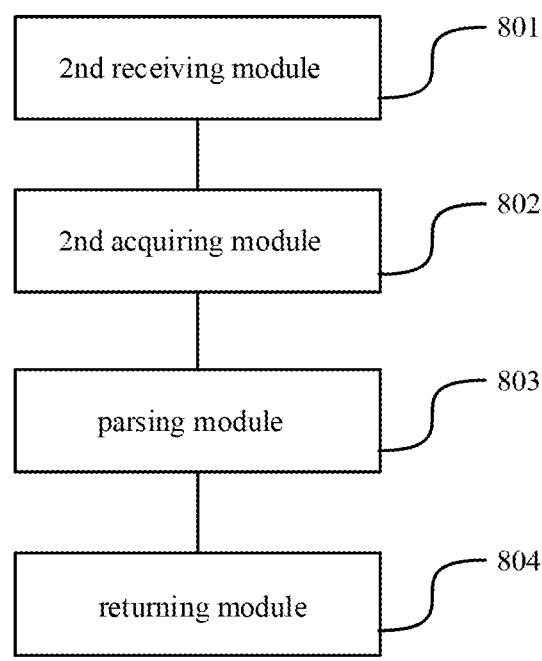
FIG. 8 is a block diagram of a device for displaying an interface according to an exemplary embodiment.

FIG. 8 is a block diagram of a device for displaying an interface according to an exemplary embodiment. Referring to FIG. 8, the device may include a second receiving module, a second acquiring module, a parsing module, and a returning module.

The second receiving module 801 can be adapted to receiving a first request sent by electronic equipment. The first request includes at least an application (APP) identifier of a first target APP.

The second acquiring module 802 is adapted to acquiring a language resource file corresponding to the first target APP according to the APP identifier.

The parsing module 803 is adapted to acquiring at least one language resource by parsing the language resource file.

The returning module 804 is adapted to returning the at least one language resource to the electronic equipment.

According to a possible implementation, the first request may further include a target language environment corresponding to the first target APP.

The parsing module 803 may further be adapted to acquiring multiple language resources by parsing the language resource file, and selecting, in the multiple language resources, the at least one language resource matching the target language environment.

With embodiments herein, a server may provide a first target APP with any language resources in multiple language environments corresponding to the first target APP. When a first target APP is to switch between language environments, rapid switching may be implemented based on language resources provided by a server. A language resource corresponding to a target language environment to which the first target APP is to switch does not have to be acquired once again from the server, improving efficiency of the first target APP in language environment switch.

Division of the functional modules in implementing the function of the device according to embodiments herein is merely illustrative. In application, the function may be allocated to be carried out by different functional modules as needed. That is, an internal structure of the server may be divided into different functional modules for carrying out all or part of the function. The device according to embodiments herein belongs to one concept as the method according to embodiments herein, implementation of which is elaborated in method embodiments herein, and is not repeated here.

Electronic equipment may include one or more processors and transitory or non-transitory memory. The transitory or non-transitory memory is adapted to storing an instruction executable by the one or more processors. The one or more processors are adapted to implement the method for displaying an interface herein.

Figure 9:
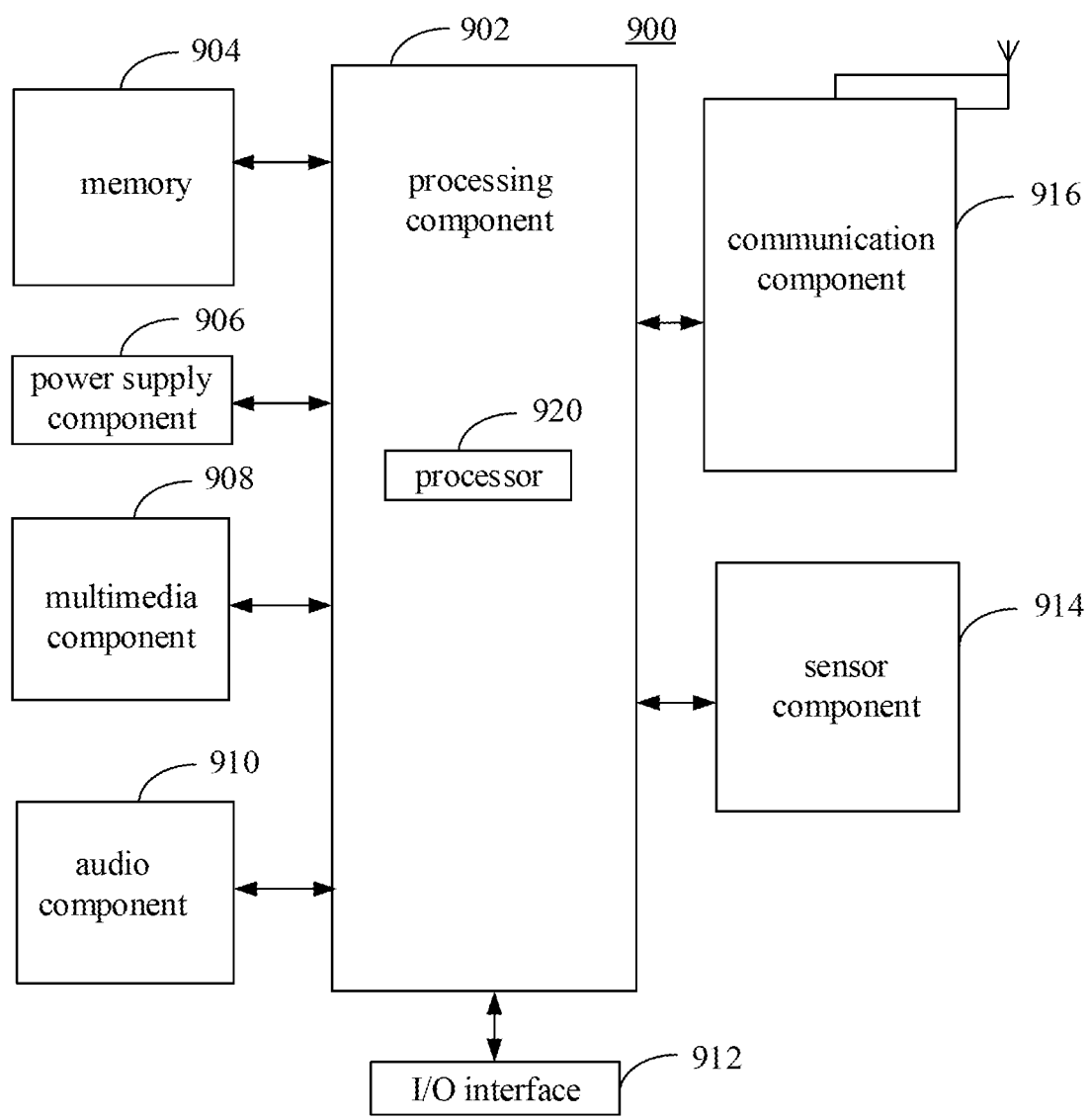
FIG. 9 is a block diagram of electronic equipment according to an exemplary embodiment.

FIG. 9 is a block diagram of electronic equipment 900 according to an exemplary embodiment. For example, the electronic equipment 900 may be UE such as a mobile phone, a computer, a digital broadcast terminal, messaging equipment, a gaming console, tablet equipment, medical equipment, exercise equipment, a personal digital assistant, and the like.

Referring to FIG. 9, the electronic equipment 900 may include at least one of a processing component 902, memory 904, a power supply component 906, a multimedia component 908, an audio component 910, an Input/Output (I/O) interface 912, a sensor component 914, or a communication component 916.

The processing component 902 may generally control an overall operation of the electronic equipment 900, such as operations associated with display, a telephone call, data communication, a camera operation, a recording operation, etc. The processing component 902 may include one or more processors 920 to execute instructions so as to complete all or a part of an aforementioned method. In addition, the processing component 902 may include one or more modules to facilitate interaction between the processing component 902 and other components. For example, the processing component 902 may include a multimedia portion to facilitate interaction between the multimedia component 908 and the processing component 902.

The memory 904 may be adapted to storing various types of data to support the operation at the electronic equipment 900. Examples of such data may include instructions of any application or method adapted to operating on the electronic equipment 900, contact data, phonebook data, messages, pictures, videos, and the like. The memory 904 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, and the like.

The power supply component 906 may supply electric power to various components of the electronic equipment 900. The power supply component 906 may include a power management system, one or more power sources, and other components related to generating, managing, and distributing electricity for the electronic equipment 900.

The multimedia component 908 may include a screen that provides an output interface between the electronic equipment 900 and a user. The screen may include a Liquid Crystal Display (LCD), a Touch Panel (TP), and the like. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 908 may include at least one of a front camera or a rear camera. When the electronic equipment 900 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 910 may be adapted to outputting and/or inputting an audio signal. For example, the audio component 910 may include a microphone (MIC). When the electronic equipment 900 is in an operation mode such as a call mode, a recording mode, a voice recognition mode, etc., the MIC may be adapted to receiving an external audio signal. The received audio signal may be further stored in the memory 904 or may be sent via the communication component 916. The audio component 910 may further include a loudspeaker adapted to outputting the audio signal.

The I/O interface 912 may provide an interface between the processing component 902 and a peripheral interface portion. Such a peripheral interface portion may be a keypad, a click wheel, a button, etc. Such a button may include but is not limited to at least one of a homepage button, a volume button, a start button, or a lock button.

The sensor component 914 may include one or more sensors for assessing various states of the electronic equipment 900. For example, the sensor component 914 may detect an on/off state of the electronic equipment 900 and relative positioning of components such as the display and the keypad of the electronic equipment 900. The sensor component 914 may further detect a change in the position of the electronic equipment 900 or of a component of the electronic equipment 900, whether there is contact between the electronic equipment 900 and a user, the orientation or acceleration/deceleration of the electronic equipment 900, a change in the temperature of the electronic equipment 900, and the like. The sensor component 914 may include a proximity sensor adapted to detecting existence of a nearby object without physical contact. The sensor component 914 may further include an optical, such as a Complementary Metal-Oxide-Semiconductor (CMOS) or a Charge-Coupled-Device (CCD) image sensor used in an imaging application. The sensor component 914 may further include an acceleration sensor, a gyroscope sensor, a magnetic sensor, a pressure sensor, a temperature sensor, and the like.

The communication component 916 may be adapted to facilitating wired or wireless communication between the electronic equipment 900 and other equipment. The electronic equipment 900 may access a wireless network based on a communication standard such as Wi-Fi, 2G, 3G . . . , or a combination thereof. The communication component 916 may broadcast related information or receive a broadcast signal from an external broadcast management system via a broadcast channel. The communication component 916 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), and the like.

The electronic equipment 900 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including instructions, such as memory 904 including instructions, may be provided. The instructions may be executed by the processor 920 of the electronic equipment 900 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

A server may include one or more processors and transitory or non-transitory memory. The transitory or non-transitory memory is adapted to storing an instruction executable by the one or more processors. The one or more processors are adapted to executing the method for displaying an interface herein.

Figure 10:
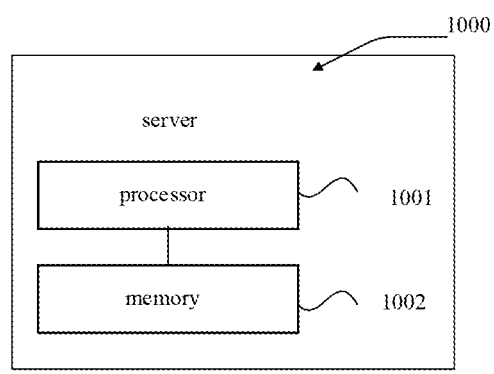
FIG. 10 is a block diagram of a server according to an exemplary embodiment.

FIG. 10 is a block diagram of a server according to an exemplary embodiment. The server 1000 may differ greatly depending on configuration or performance. The server may include one or more processors (Central Processing Units, CPU) 1001 and transitory or non-transitory memory 1002 adapted to storing instructions executable by the one or more processors. The memory 1002 may store executable instructions which, when loaded and executed by the processors 1001, implement the method according to one or more embodiments herein. Of course, the server may further include a part such as a wired or wireless network interface, a keyboard, an I/O interface, and the like, to facilitate input and output. The server may further include another part adapted to implementing a function of the equipment, which is not elaborated here.

A non-transitory computer-readable storage medium may store therein instructions which, when executed by a processor of a server, allow the server to implement the method according to one or more embodiments herein. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, and the like.

The subject disclosure also provides a computer program product including one or more computer programs which, when executed by a processor, implement the method according to one or more embodiments herein.

A person having ordinary skill in the art may understand that all or part of the options of the embodiments may be implemented through hardware, or may be completed by instructing related hardware through a program. The program may be stored in a transitory/non-transitory computer-readable storage medium. The computer-readable storage medium may be Read-Only Memory (ROM), a magnetic disk, a CD, and the like.

What described are merely embodiments herein, and are not intended to limit the subject disclosure. Various modifications and variations may be devised by a person having ordinary skill in the art. Any modification, equivalent replacement, improvement, and the like, made within the spirit and principle of the subject disclosure should be included in the scope of the subject disclosure.

Other embodiments according to the subject disclosure will be apparent to one skilled in the art after he/she has considered the subject disclosure and practiced the invention disclosed herein. The subject application is intended to cover any variation, use, or adaptation of the subject disclosure following the general principle of the subject disclosure and including such departures from the subject disclosure as come within knowledge or customary practice in the art. The subject disclosure and its embodiments are intended to be exemplary only, with a true scope and spirit of the subject disclosure being indicated by the appended claims.

The subject disclosure is not limited to the exact construction that has been described above and illustrated in the accompanying drawings. Various modifications and changes can be made without departing from the scope of the subject disclosure. It is intended that the scope of the subject disclosure be limited only by the appended claims.

What is claimed is:

1. A method for displaying an interface, comprising: acquiring, by an electronic equipment, interface data of a to-be-displayed interface of a first target application (APP), wherein the interface data comprise at least one interface element and interface-display-related information, the interface-display-related information comprising at least one of an interface interaction logic or interface-layout information related to the at least one interface element, wherein of the at least one interface element, an interface element corresponds to to-be-displayed content, a display location, and an operation interface; sending, by the electronic equipment to a server, a language resource request for requesting at least one language resource corresponding to the first target APP from the server, wherein the at least one language resource corresponding to the first target APP is a language to be displayed on the to-be-displayed interface of the first target APP; receiving, by the electronic equipment, the at least one language resource returned by the server, wherein the at least one language resource corresponding to the first target APP is not integrated in the interface data of the to-be-displayed interface of the first target APP;
determining, by the electronic equipment, in the at least one language resource, a target language resource corresponding to the interface element in the interface data; and assigning, by the electronic equipment, the target language resource corresponding to the interface element to the to-be-displayed content corresponding to the interface element, plotting the interface element at the display location corresponding to the interface element on the to-be-displayed interface, and associating the interface element with the operation interface corresponding to the interface element.

2. The method of claim 1, wherein the at least one language resource is selected from multiple language resources acquired by parsing a language resource file; wherein the determining, by the electronic equipment, in the at least one language resource, the target language resource corresponding to the interface element in the interface data comprises:
acquiring, by the electronic equipment, a target language environment corresponding to the first target APP; and determining, by the electronic equipment, the target language resource corresponding to the interface element in the interface data in the at least one language resource according to the target language environment and the interface element in the interface data.

3. The method of claim 2, wherein the at least one language resource includes a language identifier and an interface element identifier, the language identifier being adapted to identify the target language environment, and the interface element identifier being adapted to identify the interface element, wherein the determining, by the electronic equipment, the target language resource corresponding to the interface element in the interface data in the at least one language resource according to the target language environment and the interface element in the interface data comprises: determining, by the electronic equipment, in the at least one language resource according to the target language environment, the language identifier, the interface element in the interface data, and the interface element identifier, the target language resource matching the target language environment and the interface element in the interface data.

4. The method of claim 1, wherein the at least one language resource includes an interface element identifier, the interface element identifier being adapted to identify the interface element, wherein the determining, by the electronic equipment, in the at least one language resource, the target language resource corresponding to the interface element in the interface data comprises: determining, by the electronic equipment, in the at least one language resource according to the interface element identifier, the target language resource matching the interface element in the interface data.

5. The method of claim 1, wherein the acquiring, by the electronic equipment, the interface data of the to-be-displayed interface of the first target APP comprises: sending, by the electronic equipment, an interface data request to the server to acquire the interface data of the to-be-displayed interface of the first target APP; and receiving, by the electronic equipment, the interface data returned by the server.

6. A method for displaying an interface, comprising: receiving, by a server, a language resource request sent by an electronic equipment, the language resource request including at least an application (APP) identifier of a first target APP; acquiring, by the server, a language resource file corresponding to the first target APP according to the APP identifier; acquiring, by the server, at least one language resource corresponding to the first target APP by parsing the language resource file, wherein the at least one language resource corresponding to the first target APP is a language to be displayed on a to-be-displayed interface of the first target APP;

and returning, by the server, the at least one language resource to the electronic equipment; acquiring, by the electronic equipment, interface data of the to-be-displayed interface of the first target APP, wherein the interface data of the to-be-displayed interface of the first target APP comprise at least one interface element and interface-display-related information, the interface-display-related information comprising at least one of an interface interaction logic or interface-layout information related to the at least one interface element, wherein of the at least one interface element, an interface element corresponds to to-be-displayed content, a display location, and an operation interface, wherein the at least one language resource corresponding to the first target APP is not integrated in the interface data of the to-be-displayed interface of the first target APP.

7. The method of claim 6, wherein the language resource request further includes a target language environment corresponding to the first target APP, wherein the acquiring, by the server, the at least one language resource corresponding to the first target APP by parsing the language resource file comprises: acquiring, by the server, multiple language resources by parsing the language resource file; and selecting, by the server, in the multiple language resources, the at least one language resource matching the target language environment.

8. An electronic equipment, comprising a processor and a non-transitory memory that is adapted to store an instruction executable by the processor, the processor being adapted to:
  acquire interface data of a to-be-displayed interface of a first target application (APP), wherein the interface data comprise at least one interface element and interface-display-related information, the interface-display-related information comprising at least one of an interface interaction logic or interface-layout information related to the at least one interface element, wherein of the at least one interface element, an interface element corresponds to to-be-displayed content, a display location, and an operation interface;
  send, to a server, a language resource request for requesting at least one language resource corresponding to the first target APP from the server, wherein the at least one language resource corresponding to the first target APP is a language to be displayed on the to-be-displayed interface of the first target APP;
  receive the at least one language resource returned by the server, wherein the at least, one language resource corresponding to the first target APP is not integrated in the interface data of the to-be-displayed interface of the first target APP;
  determine, in the at least one language resource, a target language resource corresponding to the interface element in the interface data; and
  assigning, by the electronic equipment, the target language resource corresponding to the interface element to the to-be-displayed content corresponding to the interface element, plotting the interface element at the display location corresponding to the interface element on the to-be-displayed interface, and associating the interface element with the operation interface corresponding to the interface element.

9. The electronic equipment of claim 8, wherein the at least one language resource is selected from multiple language resources acquired by parsing a language resource file;
wherein the determining, in the at least one language resource, the target language resource corresponding to the interface element in the interface data, comprises: acquiring a target language environment corresponding to the first target APP; and determining, in the at least one language resource according to the target language environment and the interface element in the interface data, the target language resource corresponding to the interface element in the interface data.

10. The electronic equipment of claim 9, wherein in the at least one language resource includes a language identifier and an interface element identifier, the language identifier being adapted to identify the target language environment, and the interface element identifier being adapted to identify the interface element, wherein the determining, in the at least one language resource according to the target language environment and the interface element in the interface data, the target language resource corresponding to the interface element in the interface data, comprises: determining, in the at least one language resource according to the target language environment, the language identifier, the interface element in the interface data, and the interface element identifier, the target language resource matching the target language environment and the interface element in the interface data.

11. The electronic equipment of claim 8, wherein the at least one language resource includes an interface element identifier, the interface element identifier being adapted to identify the interface element, wherein the determining, in the at least one language resource, the target language resource corresponding to the interface element in the interface data, comprises: determining, in the at least one language resource according to the interface element identifier, the target language resource matching the interface element in the interface data.

12. The electronic equipment of claim 8, wherein the processor is being adapted to acquire the interface data of the to-be-displayed interface of the first target APP by: sending an interface data request to the server to acquire the interface data of the to-be-displayed interface of the first target APP; and receiving the interface data returned by the server.

* * * * *